United States Patent [19]
Van Den Goor

[11] Patent Number: 5,826,704
[45] Date of Patent: Oct. 27, 1998

[54] CONVEYOR

[75] Inventor: Jacobus M. Van Den Goor, SH Nuenen, Netherlands

[73] Assignee: Vanderlande Industries Nederland B.V., Veghel, Netherlands

[21] Appl. No.: 837,851

[22] Filed: Apr. 22, 1997

Related U.S. Application Data

[62] Division of Ser. No. 584,267, Jan. 11, 1996, Pat. No. 5,667,054.

[30] Foreign Application Priority Data

Jan. 30, 1995 [NL]   Netherlands ............................ 9500161

[51] Int. Cl.$^6$ .................................................... B65G 17/06
[52] U.S. Cl. ............................................ 198/851; 198/853
[58] Field of Search ..................................... 198/813, 850, 198/851, 853

[56] References Cited

U.S. PATENT DOCUMENTS

| | | | |
|---|---|---|---|
| 3,231,066 | 1/1966 | Harrison et al. | 198/370.04 |
| 3,395,785 | 8/1968 | Rysti . | |
| 4,031,998 | 6/1977 | Suzuki et al. | 198/370.04 |
| 4,195,887 | 4/1980 | Ruddell | 198/853 |
| 4,461,378 | 7/1984 | Roth | 198/370.04 |
| 5,161,674 | 11/1992 | Rutz et al. | 198/851 X |
| 5,407,061 | 4/1995 | Okada et al. | 198/852 X |
| 5,427,223 | 6/1995 | Van Den Goor . | |
| 5,429,227 | 7/1995 | Krossmann et al. | 198/852 |
| 5,435,429 | 7/1995 | Van Den Goor . | |
| 5,489,017 | 2/1996 | Bonnet | 198/370.04 |

FOREIGN PATENT DOCUMENTS

2 304 413  10/1976  France .

*Primary Examiner*—James R. Bidwell
*Attorney, Agent, or Firm*—Oblon, Spivak, McClelland, Maier & Neustadt, P.C.

[57]                 ABSTRACT

A conveyor is provided with at least one flexible elongated transporter which is movable lengthwise by a driving mechanism. Overlapping platforms are coupled to the transporter by the use of supports. At least some of the supports connecting the platforms to the transport mechanism are capable of pivoting movement with respect to the transporter about pivot pins extending parallel to the longitudinal direction of the transporter. Mechanisms are provided for causing selected supports and the platforms connected thereto to pivot about associated pivot pins in at least one predetermined place. The supports are arranged in spaced-apart groups of two supports disposed near each other, whereby the platforms connected to the supports of one group extend from the respective supports in a direction away from each other. The end of a platform connected to one support of a group which faces away from the support in question is overlapped by the end of the platform connected to the support in question of the adjacent group which faces away from the support of an adjacent group. Screens extending from the adjacent ends of the platforms connected to the supports of a group in the direction of the transporter link up with the ends of the platforms.

2 Claims, 8 Drawing Sheets

CONVEYOR

This is a Division of application Ser. No. 08/584,267 filed on Jan. 11, 1996, now U.S. Pat. No. 5,667,054.

BACKGROUND OF THE INVENTION

1. Field of the Invention

The invention relates to a conveyor provided with least one flexible elongated transport means, which is movable lengthwise by driving means, and with overlapping platforms coupled to said transport means by means of supports for supporting objects to be moved by means of the conveyor, whereby at least some of the supports connecting said platforms to said transport means are capable of pivoting movement with respect to said transport means about pivot axes extending at least substantially parallel to the longitudinal direction of said transport means, while means are provided for causing selected supports and the platforms connected thereto to pivot about associated pivot pins in one or more predetermined places, if desired.

2. Discussion of the Background

From French Patent No. 2.182.148 a conveyor comprising spaced-apart platforms is known. Objects can be placed on said platforms at a charging station, and at a desired discharging station of a number of discharging stations disposed along the path of movement of the transport means and the platforms connected thereto a desired platform can be pivoted so as to discharge an object present On the platform in question. A drawback of this known device is that during the pivoting movement of a platform to a part of an object present on an adjacent platform which projects beyond said platform may become wedged between the adjacent platforms, which may inter alia disrupt the intended discharge of the objects. Furthermore parts of objects projecting beyond the platforms may become wedged between adjacent platforms when, the transport means and the platforms connected thereto pass a curve.

Furthermore conveyors having overlapping platforms are known, whereby the platforms are usually made of a slightly flexible material. It has been considered to arrange such overlapping platforms in such a manner that they can pivot in groups with respect to each other about pivot axes extending in the longitudinal direction of the transport means, in order to discharge objects present on the platforms. Also in this case there will be the danger of parts of objects becoming wedged between the adjacent groups of platforms being capable of pivoting movement with respect to each other.

SUMMARY OF THE INVENTION

The object of the invention is to obtain a conveyor of the above kind, wherein the drawbacks of these known conveyors can be avoided.

According to the invention this can be achieved in that the supports are arranged in spaced-apart groups of two supports disposed near each other, whereby the platforms connected to the supports of one group extend from the respective supports in a direction away from each other, and whereby the end of a platform connected to one support of a group which faces away from the support in question is overlapped by the end of a platform connected to the support in question of the adjacent group which faces away from the support of the adjacent group, while screens extending from the adjacent ends of the platforms connected to the supports of a group in the direction of the transport means link up with said ends of the platforms.

When using the construction according to the invention two overlapping platforms and the supports connecting said platforms to the transport means can be pivoted independently of the other platforms, if desired. The screens thereby prevent parts of objects from becoming wedged between the end of a platform which is being pivoted and the facing end of a platform which is not being pivoted. If desired it will of course also the possible to pivot several groups of, two overlapping platforms simultaneously, or for example to pivot groups of two overlapping platforms moving one behind the other in succession at a particular point of discharge.

By using the construction according to the invention a conveyor may be obtained wherein the platforms form a substantially closed surface for supporting objects when occupying a position in which they are not pivoted, while it is still possible to discharge objects from the conveyor in a simple and efficient manner without any danger of the objects becoming wedged or the like.

Another aspect of the invention relates to a conveyor provided with at least one flexible elongated transport means, which is built up of links, whereby a link is capable of pivoting movement about a first pivot axis with respect to an adjacent link near one end, said link near its other end being capable of pivoting movement with respect to another adjacent link, about a second pivot axis crossing said first pivot axis at least substantially perpendicularly, while platforms are coupled to said transport means for supporting objects to be moved by means of the conveyor and driving means are provided, which engage the transport means in order to move said transport means in its longitudinal direction.

The object of the invention is to obtain a conveyor of this type, wherein the drive can be effected in a simple manner by means of a driving means engaging one side of the transport means.

According to the invention: this may be achieved in that successive links comprise overlapping parts near the pivot axes, through which parts said pivot axes extend, and in that said links are provided, at least on one side, with side faces forming an at least substantially straight closed surface in the extended position of the transport means.

By using the construction according to the invention a conveyor has been obtained wherein the transport means can be guided along a path which varies both in a vertical and in a horizontal direction, while it is possible to realize a regular, continuous drive of the transport means by means of a simple driving belt or driving wheel, which in a straight part of the transport means engages the side faces of the links forming an at least substantially straight closed surface, so that an at least substantially shock-free and low-noise drive can be realized.

BRIEF DESCRIPTION OF THE DRAWINGS

The invention will be explained in more detail hereafter with reference to a conveyor according to the invention diagrammatically illustrated in the accompanying Figures.

DESCRIPTION OF THE PREFERRED EMBODIMENTS

The conveyor, which is shown diagrammatically and only partially in the Figures, comprises an endless transport means (i.e., a transporter) or driving chain 1, which is built up of a plurality of links 2 and 3.

Figure 1:
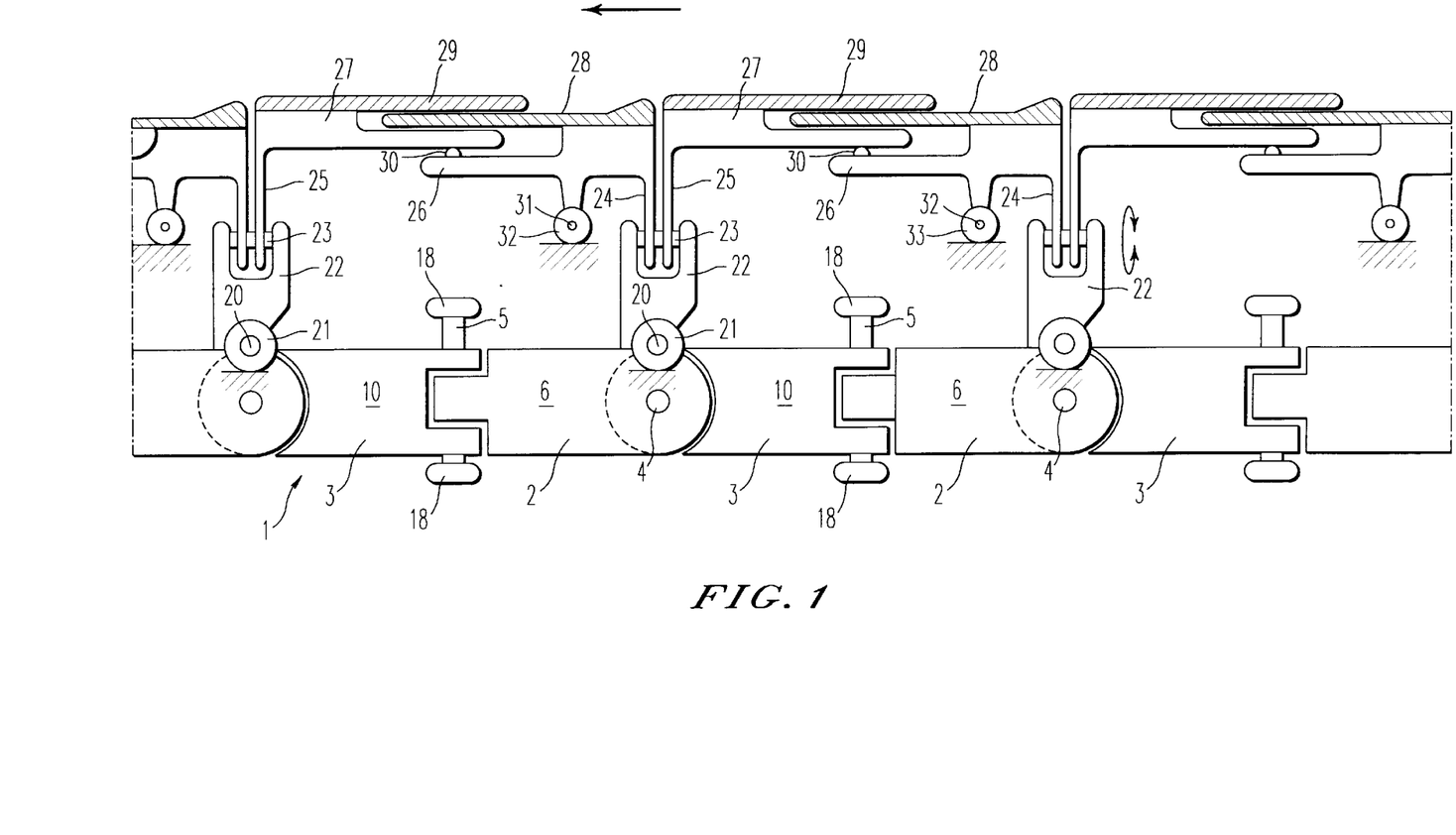
FIG. 1 shows, partly in side view and partly in sectional view, a part of a conveyor according to the invention.

As will be apparent from FIG. 1, link 2 is coupled to an adjacent link 3 near one end, by means of a pivot pin 4 extending horizontally and perpendicularly to the plane of the drawing of FIG. 1. Near its other end the link 2 is coupled to an adjacent link 3 by means of a pivot pin 5 crossing pivot pin 4 perpendicularly.

Figure 4:
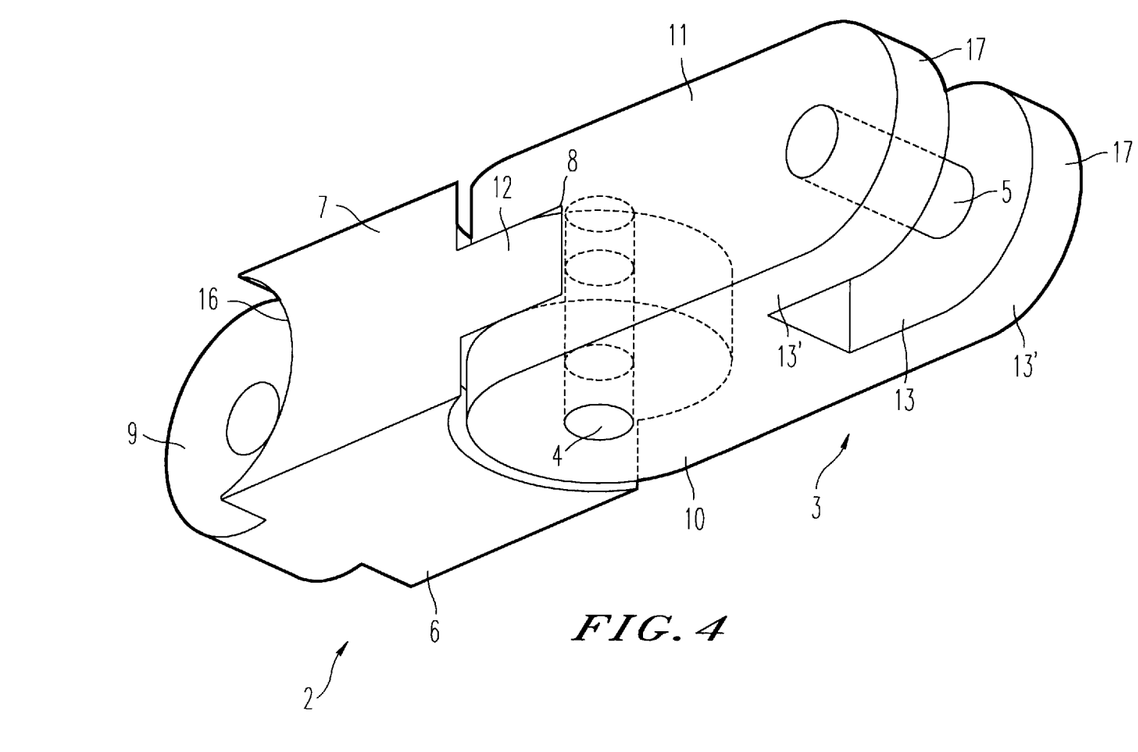
FIG. 4 is a perspective view of two adjacent, interconnected links of the transport means of the conveyor according to the invention.

In the embodiment shown in FIG. 4 the body of the central link 2 is bounded by two spaced-apart parallel side faces 6, which are connected at their edges by side faces 7 extending perpendicularly to said side faces 6. A projecting tongue 9 is provided at one end of link 2, while a projecting tongue 12 extending perpendicularly to tongue 9 is provided at the opposite end of link 2.

The body of link 3 is likewise bounded by two side faces 10 extending parellel to each other, and by side faces 11 extending perpendicularly to and between said side faces 10.

A slotted hole 8 is formed at one end of the link 3, in which the tongue 9 of the adjacent link 2 is positioned in the assembled condition of the transport means or chain, whereby pivot pin 4 extends through respective holes provided in the legs of link 3 on either side of the slotted hole 8 and in tongue 12 of link 2 when so positioned. As will furthermore be apparent from FIG. 4, the ends of the parts of link 3 positioned on either side of the recess 8 which face link 2 include boundary surfaces extending concentrically around pivot pin 4. The boundary surfaces of link 2 facing said ends of link 3 are correspondingly curved and are positioned close to the respective ends of link 3.

In the assembled condition of the transport means or driving chain 1, the tongue 9 of a link 2 will be positioned within a recess 13 of an adjacent link 3, and be coupled to the adjacent link 3 at that location by means of pivot pin 5, which is passed through holes formed in tongue 9 and in respective legs 13' of link 3 bounding recess 13.

The boundary surfaces 16 of link 2 positioned on either side of the tongue 9 and facing the adjacent link 3 extend concentrically around pivot pin 5, as do the nearby boundary surfaces 17 facing said boundary surfaces 16 at the end of link 3 facing the respective end of link 2.

Figure 2:
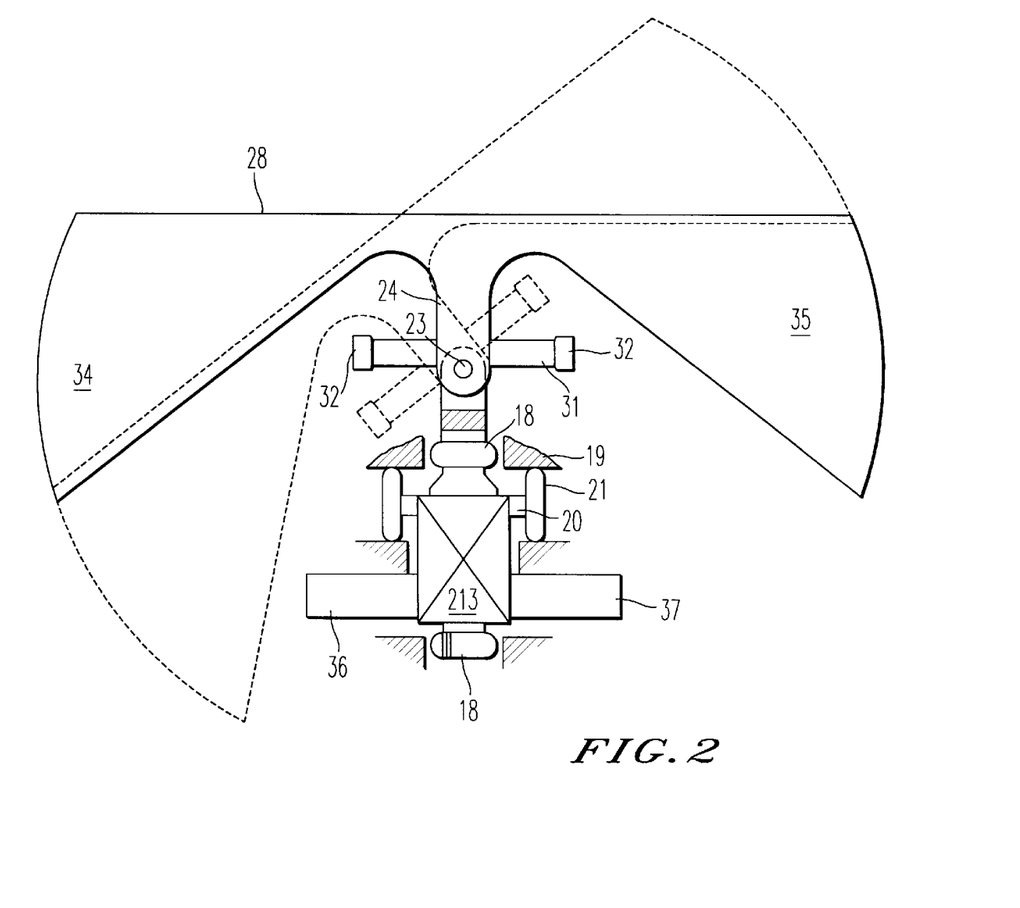
FIG. 2 is a cross-sectional view of FIG. 1.
Figure 3:
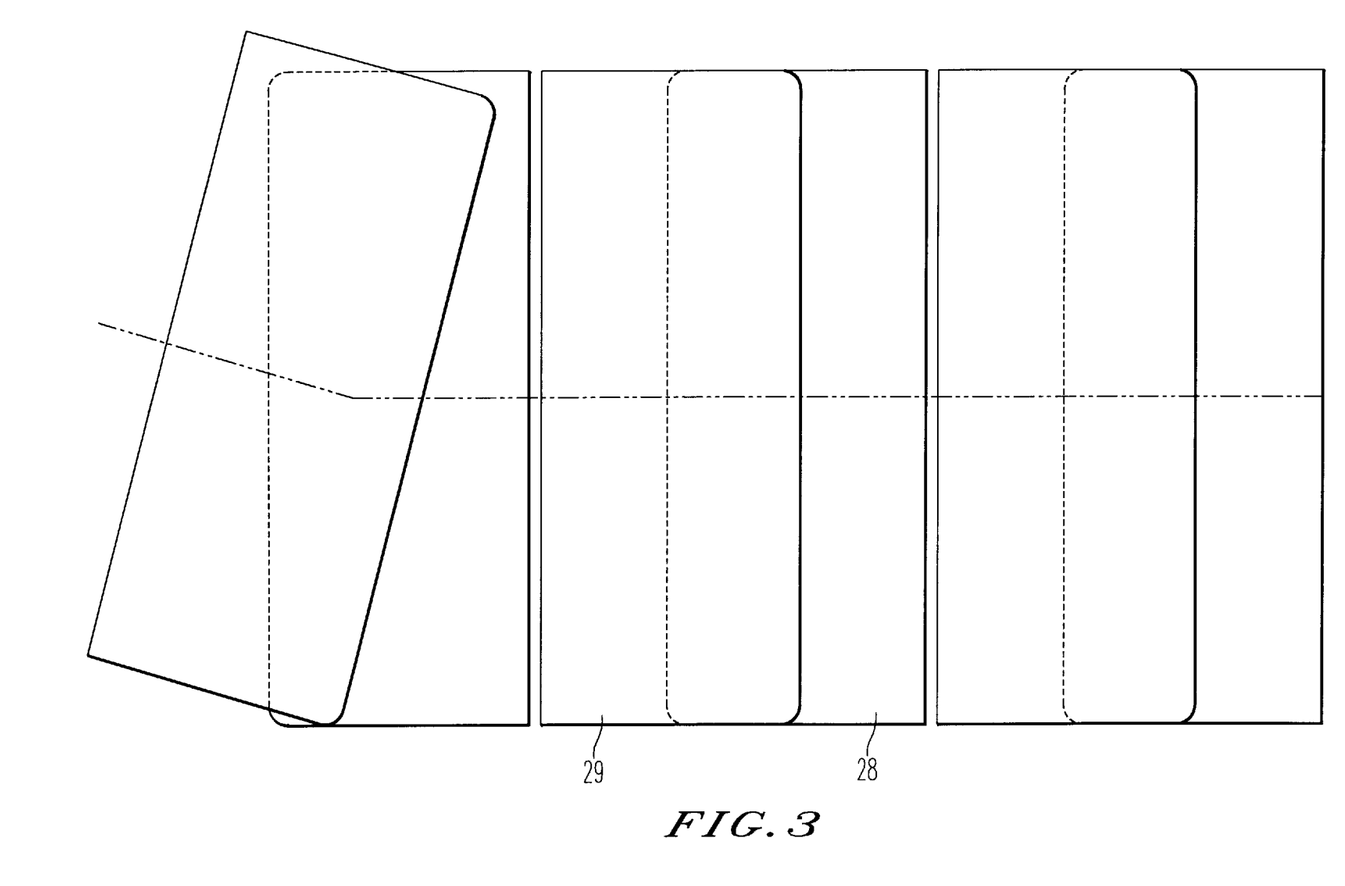
FIG. 3 is a plan view of overlapping platforms of the conveyor.

The configuration of the links shown in FIG. 2 is slightly different from the configuration shown in FIG. 4, since link 2 of the embodiment according to FIG. 2 is provided, at its end facing away from tongue 9, with a slotted hole corresponding with slotted hole 8, and link 3 comprises a projecting tongue instead of a slotted hole 8, which tongue fits the slotted hole formed in link 2.

It will be apparent that the above-described configuration leads to a transport means or driving chain having a construction such that the side faces 6 and 10 of the links being in line on one side of the transport means, as well as the side faces of the links being in line on the other side of the transport means, form a straight and substantially closed surface in an extended part of the transport means or driving chain as shown in FIG 1. There are several advantages to this, as will be set forth in more detail below.

Guide wheels 18 are secured to the ends of the vertical pivot pins 5, which guide wheels function to guide the transport means or driving chain 1 in a frame 19 of the conveyor, which is diagrammatically indicated in FIG. 2. Furthermore pins 20 extending parallel to pivot pins 4 are secured to the links 2 near said pivot pins 4, said pins carrying guide wheels 21 supported by frame 19.

Furthermore supports 22 extending upward from links 2 are secured to the ends of links 2 located near pivot pins 4, said supports 22 supporting pins 23 extending in the longitudinal direction of transport means 1. A group of two supports 24 and 25 is coupled to each of said pins 23. Arms 26 and 27 extending in directions away from each other are secured to the upper ends of supports 24 and 25 respectively. Arm 26 supports a platform 28, while arm 27 supports a platform 29.

As will be apparent from FIG. 1, a platform 29 supported by a support 25 associated with a particular group of two carriers 24, 25 overlaps a free end of a platform 28 supported by a support 24 associated with an adjacent group of supports 24, 25. A prop 30 is formed on the free end of arm 26, near the overlapping parts of platforms 28 and 29, which prop supports one end of an arm 27 located thereabove.

Furthermore a pin 31 extending perpendicularly to arm 26 is connected to each arm 26. Guide rollers 32 are provided on the free ends of said pin. Said guide rollers 32 run on guide rails 33 diagrammatically indicated in FIG. 1, in order to prevent the platforms from pivoting about pins 23.

Two screen parts 34 and 35 forming a screen are secured to support 24 as well as to support 25. As will be apparent from FIG. 2, in the non-pivoted position of the associated platform said screen parts are positioned on either side of a plane extending vertically and through the associated pivot pin 23, whereby the height of each of the screen parts 34 and 35 gradually increases in a direction away from said plane.

It will be apparent that as a result of the above-described configuration of the transport means or driving chain 1 the links of the chain can be pivoted horizontally as well as vertically relative to each other, so that transport means 1 and the platforms connected thereto can be moved along any desired path, whereby the overlapping ends of platforms 28 and 29 can move relative to each other when the overlapping parts pivot about an imaginary pivot axis being in line with a vertical pivot pin 5.

Since at least the overlapping parts of the platforms are made of the flexible material, the platforms will not block a pivoting movement in vertical direction, either.

As is diagrammatically illustrated in FIG. 2, an endless conveyor belt 36 or one or more driving wheels for driving transport means 1 may be provided near a part of said transport means 1 in which the links 2 and 3 are in line, as shown in FIG. 1, said conveyor belt or said driving wheels engaging one side of the transport means. On the opposite side a similar driving means 37 may be provided, or a number of supporting rollers, which are capable of taking up the forces exerted in transverse direction on transport means 1 by driving means 36.

As already explained above, the side faces 7 of the co-axial links that face driving means 36 form an at least substantially straight and closed surface, so that an even, shock-free and substantially noiseless drive can be realized by means of such a driving belt or driving wheels.

Figure 5:
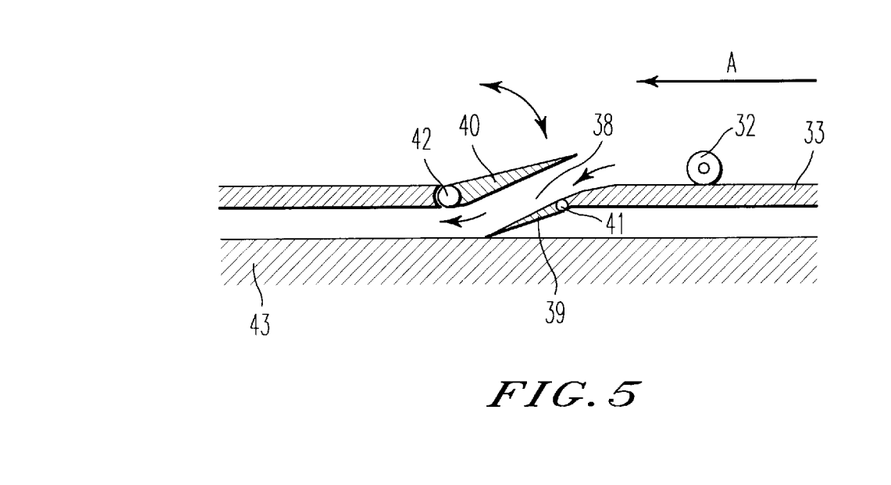
FIG. 5 shows a possible arrangement of a change-over mechanism for causing the platforms to pivot.

In order to be able to pivot a group of two overlapping platforms 28 and 29 about the respective pivot pins 23 with respect to the transport means, an opening 38 may be provided in guide rail 33 at a desired location (FIG. 5). Switch tongues 39 and 40 are provided near said opening 38. Switch tongue 39 is capable of pivoting movement about a pivot pin 41 extending perpendicularly to the longitudinal direction of rail 33, said pivot pin 41 being disposed at the upstream end of opening 38, seen in the intended direction of movement of transport means 1 according to arrow A. Switch tongue 40 is capable of pivoting movement about a pivot pin 42, which is disposed at the downstream end of opening 38, seen in the direction of movement A.

In the position shown in FIG. 5, in which switch tongue 40 is pivoted upwards, a guide roller 32 being connected to an arm 26 and moving in the direction according to arrow A will be moved downward by the switch tongue, so that said roller will run on a rail 43 positioned lower than rail 33 and/or against the underside of said rail. It will be apparent that said moving downward of a guide roller 32 will result in a pivoting movement of the support 24 supporting said guide roller and the platform 28 supported by said support. The platform 28 will take along the platform 29 overlapping platform 28 thereby, so that the two overlapping platforms will be jointly pivoted with respect to transport means 1. An object that may be present on said platforms can thus slide from the platforms in question.

When switch tongue 40 has pivoted downward from the position shown in FIG. 5, a guide roller moving in the direction according to arrow A will be able to pass said tongue 40, and the platform connected to the guide roller in question will not be pivoted, therefore.

A guide roller moving over rail 43 and/or under rail 33, which may have been moved downward before, will be able to pass switch tongue 39 because switch tongue 39 can pivot upwards to that end.

It will be apparent that similar switch tongues may be disposed in mirror image relationship at a desired place located further downstream, in order to carry a guide roller back to the upper side of rail 33 again.

The switch tongue 40 may be controlled by mechanical, electronic, hydraulic or pneumatic means, for example, whereby said control may for example take place by means of reading devices, which read data provided on the objects to be moved by the conveyor and which may also measure the length of an object.

It will be apparent that when a group of two platforms is pivoted with respect to platforms positioned on either side thereof, the screens 34 and 35, which link up with the lateral ends of the overlapping platforms that face away from each other and which extend downward from said (ends of the platforms, will pivot along the corresponding screens of the platforms not being pivoted. The screens thereby prevent an projecting part of an object present on a platform from landing under a tilted platform, thus causing an obstruction as a result of such a projecting part becoming wedged between adjacent platforms upon tilting back said tilted platform.

The device shown in FIG. 5 can pivot only one group of two overlapping platforms and allow the next group to pass without impediment. It is also possible, however, to pivot several successive groups of overlapping platforms in succession.

Figure 6:
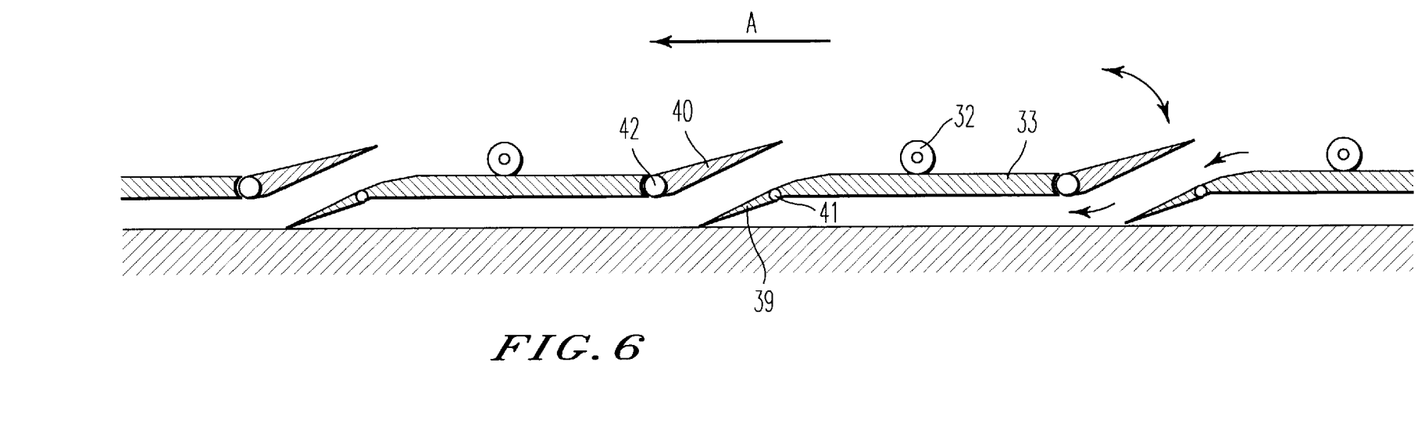
FIG. 6 shows an assembly of a few change-over mechanisms for pivoting platforms.

As is furthermore shown in FIG. 6, several switches of the construction shown in FIG. 5 may be disposed one behind the other at a particular place along the path of the transport means. In the embodiment shown in FIG. 6 three such switch constructions are disposed closely together. When such a construction is used it becomes possible to pivot one group of two overlapping platforms, two groups of overlapping platforms or three groups of overlapping platforms simultaneously, as desired, about the respective pivot pins 23 with respect to transport means 1. Thus it is for example possible to bring the number of platforms being pivoted into conformity with the number of platforms being occupied by a single object.

The fact is that when the objects being transported always have the same dimensions, it will be possible to couple the various switch tongues 40 shown in FIG. 6 or the setting means of said switch tongues by mechanical or electric means, so that the switch tongues will pivot simultaneously. When the objects have varying lengths, however, it may be arranged that the various switch tongues 40 forming part of the arrangement shown in FIG. 6 can be pivoted independently of each other.

Furthermore it will be apparent that one or more switch constructions may be provided in rail 33, which supports the left-hand guide roller 32, seen in FIG. 2, as well as in rail 33, which supports the right-hand guide roller 32, seen in FIG. 2, so that the platforms can be pivoted in two different directions from the normal transporting position to a sloping position.

The various possibilities which may be realized with the construction according to the invention are diagrammatically indicated in FIG. 7 again.

Figure 7:
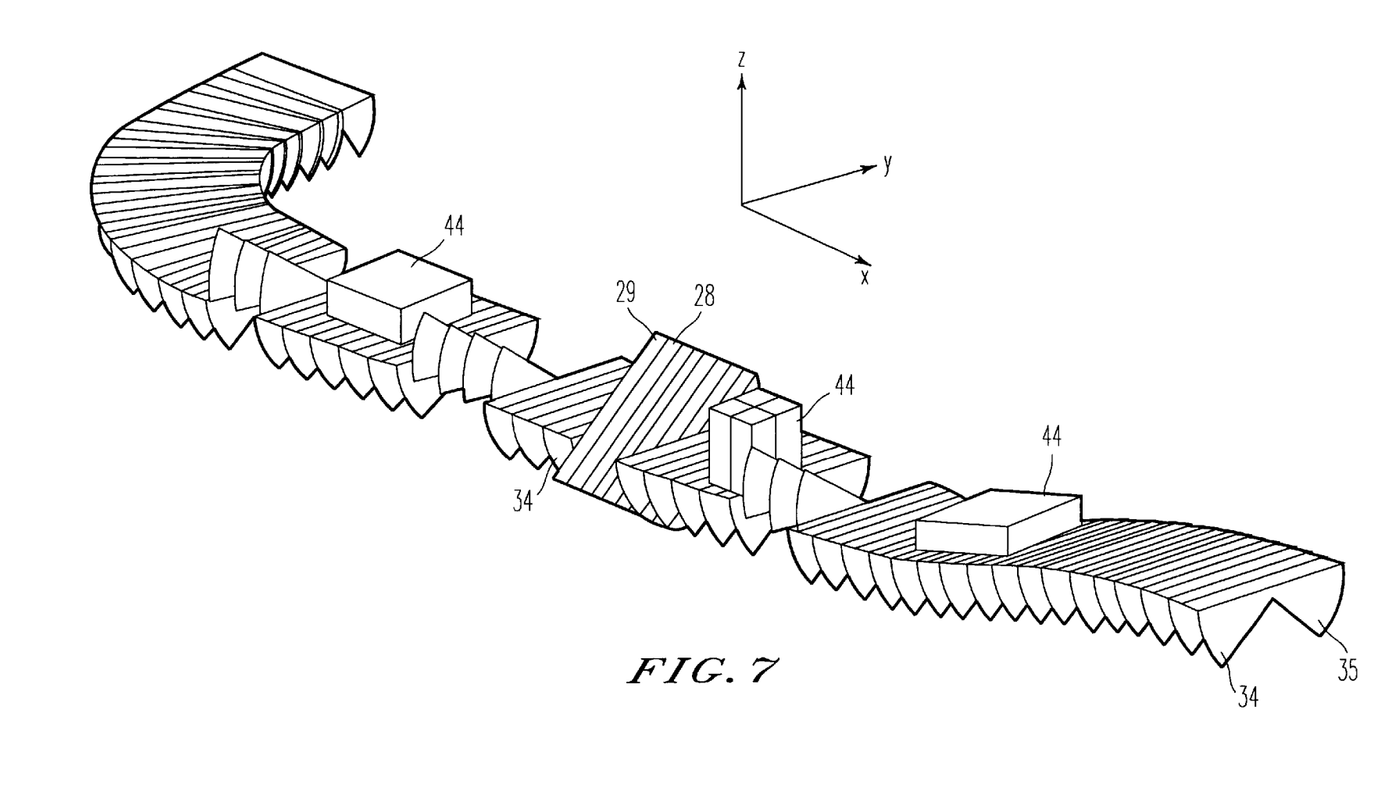
FIG. 7 diagrammatically shows a number of platforms of a conveyor according to the invention, illustrating several possibilities for pivoting platforms.

As will be apparent from said Figure, the transport means 1 and the overlapping platforms supported thereby can move in directions X, Y and Z respectively, while the overlapping platforms can be pivoted in the one or other direction in groups of any desired number in order to deliver objects 44 supported on the platforms at a desired location.

Of course additions and/or variations to the above-described embodiment of the conveyor according to the invention are conceivable.

Thus a spring may be connected to switch tongue 39, if desired, which spring attempts to keep switch tongue 39 in a position in which said tongue has pivoted upwards from the position shown in FIG. 5 or in FIG. 6.

Furthermore the platforms may have any desired shape, being slightly bent or slightly V-shaped, for example. The surface of such a platform may or may not be symmetrical thereby to a plane extending perpendicularly to the plane of the drawing of FIG. 2 and through pivot pin 23.

Instead of mechanical means also hydraulic, pneumatic or electric driving means may be used for pivoting the platforms about pivot pins 23, which driving means may for example be remotely controlled. In connection with this reference may be made to the embodiment of FIG. 8. This embodiment substantially corresponds with the embodiment described above and consequently those parts of FIG. 8 that correspond with parts described with reference to the preceding Figures have been given the same reference numerals.

Figure 8:
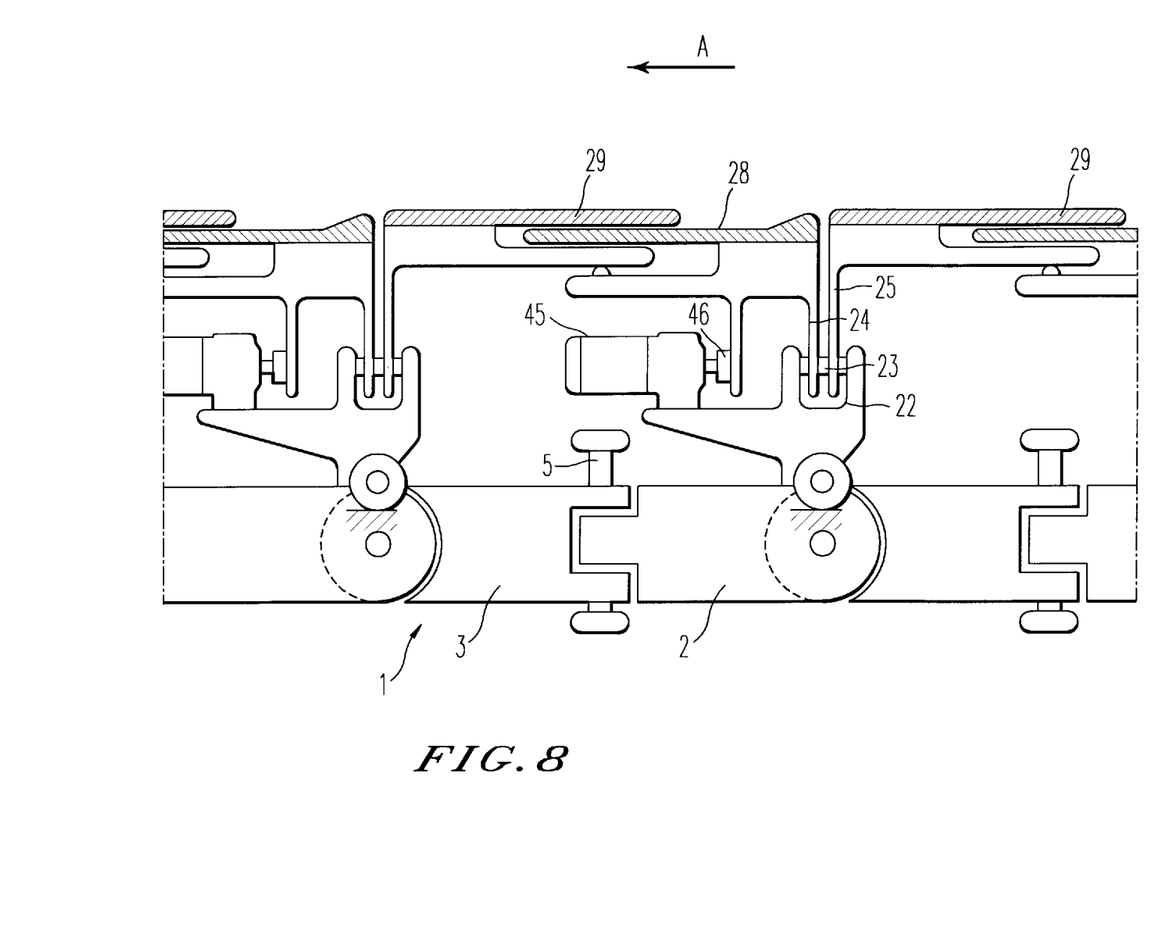
FIG. 8 is a view corresponding with FIG. 1 of part of a further embodiment of a conveyor according to the invention.

As is shown in FIG. 8, the support 22 supports an electromotor 45, which is coupled to the arm 26 by means of a transmission mechanism 46 (only diagrammatically indicated), all this in such a manner that when the motor 45 is caused to run in the one or other direction, the support 24 and the platform 28 connected thereto will be pivoted about pivot pin 23 in the one or the other direction.

FIGS. 9–12 furthermore show a few further possibilities for interconnecting two links 2 and 3. Parts corresponding with the above-described parts of links 2 and 3 have been given the same reference numerals as the corresponding parts shown in particular in FIG. 4 and discussed with reference to said FIG. 4.

Figure 9:
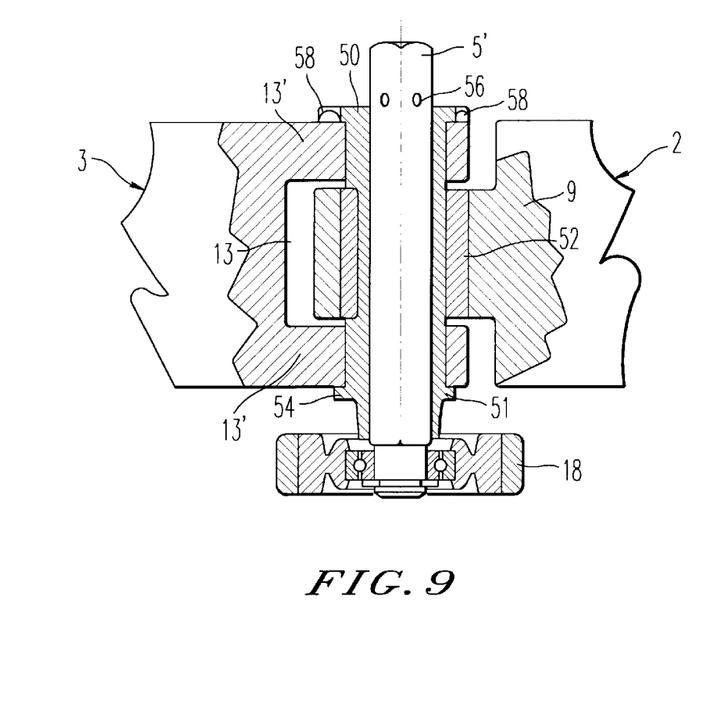
FIG. 9 shows a further possibility for interconnecting two links of the driving means.
Figure 10:
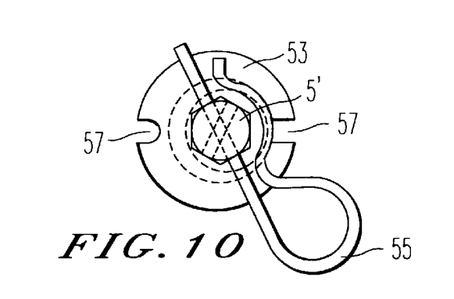
FIG. 10 is a plan view of a part of FIG. 9.

As is apparent from FIGS. 9 and 10, a pin 5' having a hexagonal section is provided instead of around pin 5. Said pin 5' is surrounded by two coaxial sleeves 50 and 51, said sleeves being provided with internal passages, whose diameter corresponds with the diameter of pin 5', so that sleeves 50 and 51 cannot rotate with respect to pin 5'.

The facing ends of the sleeves are stepped, in such a manner that a projecting part of the one sleeve engages in a corresponding recess in the end of the other sleeve.

The outer circumferences of the facing ends of the sleeves 50 and 51, which are disposed closely together, extend concentrically about the central axis of pin 5' and are accommodated in a metal sleeve 52 which is provided in the tongue 9, for example pressed into position therein.

The circular outer circumferences of the ends of sleeves 50 and 51 projecting beyond sleeve 52 are disposed eccentrically with respect to the central axis of pin 5'. Said ends of sleeves 50 and 51 projecting beyond sleeve 52 are accommodated in corresponding round holes formed in the legs 13' of link 3.

At its upper side, seen in FIG. 9, the sleeve 50 is furthermore provided with a projecting flange 53, which abuts against the outer side of a leg 13'. In a similar manner sleeve 51 is provided with a projecting flange 54 abutting against a leg 13' of link 3. In the operative position shown in FIG. 9 pin 5' is locked against axial movement by means of a locking pin 55, which is passed through a respective hole 56 formed in pin 5'.

Two diametrically opposed recesses 57 are formed in flange 53, in which recesses cams 58 secured to a leg 13' of link 3 are positioned. It will be apparent that said cams 58 prevent sleeve 50, and thus also sleeve 51 and pin 5' positioned within sleeves 50 and 51, from rotating about the central axis of pin 5'.

Devices comprising transport means or transport chains of the kind described above are usually provided with tensioning devices, in order to be able to re-tension the transport chain during operation. Such a re-tensioning device is not required when the construction as shown in FIGS. 9 and 10 is used. After all it will be apparent that when the sleeve 50 is slightly moved upward after the locking pin 55 has been removed, so that the flange 53 will come to lie above cams 58, pin 5' and with it sleeves 50 and 51 can be rotated through an angle of 180° about the central axis of said pin, as a result of which the facing ends of links 2 and 3 illustrated in FIG. 9 will be moved towards each other. After pin 5' has been rotated through an angle of 180°, sleeve 50 may be moved downward again, so that cams 58 will engage in recesses 57 again, in order to lock sleeves 50 and 51 and pin 5' against rotation again. Then the locking pin 55 may be provided.

It will be apparent that by thus rotating the pins 5' interconnecting one or more links (also the above-described pins 4 may be replaced by similar pins and sleeves supporting said pins) it is possible to tension the chain.

Figure 11:
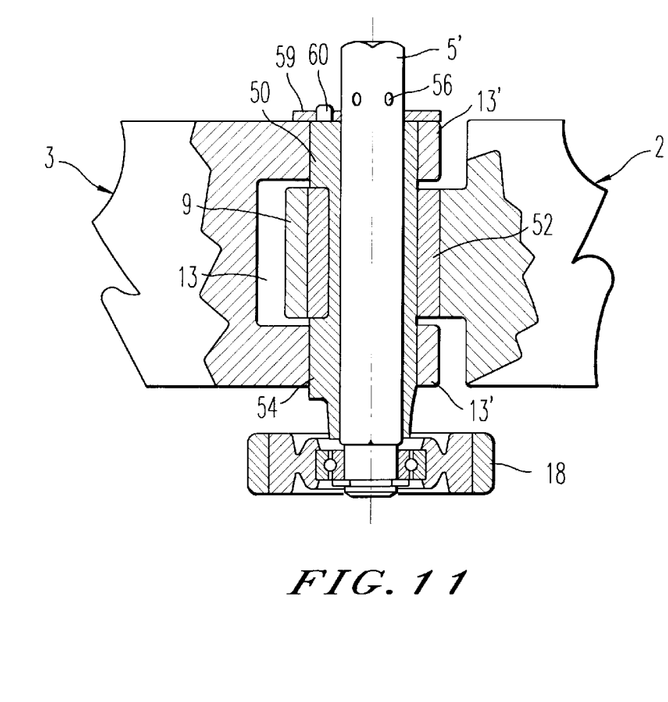
FIGS. 11 and 12 are views corresponding with FIGS. 9 and 10, illustrating another possibility for interconnecting links.
Figure 12:
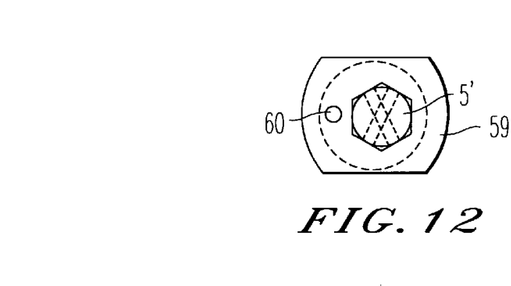

FIGS. 11 and 12 show a variant to the embodiment described in FIGS. 9 and 10. In this embodiment sleeve 50 is not provided with a projecting flange 57, but a locking disc 59 is slid over the end of pin 5' projecting from leg 13' of link 3, to which end said locking disc is provided with a hole, whose shape corresponds with the hexagonal section of pin 5', so that disc 59 cannot rotate with respect to said pin.

The disc is furthermore provided with a bore, in which a locking pin 60 secured to link 3 is positioned, so that in the position shown in FIG. 11 locking disc 59 and thus also pin 5' cannot rotate about the central axis of pin 5' with respect to link 3. After locking disc 59 has been removed, pin 5' can be rotated and subsequently be locked against rotation again by providing locking disc 59. It will be apparent that it is not necessary to rotate pin 5' through 180° in this embodiment, but that pin 5' can also be locked against rotation in intermediate positions by means of locking disc 59.

Thus it will be obvious to a person skilled in the art that many variations and/or additions to the above-described embodiments of the device according to the invention are possible within the spirit and scope of the invention.

I claim:

1. A conveyor, which comprises:
   at least one flexible elongated transporter, which includes a plurality of links, wherein two of said links are pivotable about a pivot axis with respect to each other; and
   a mechanism interconnecting said links, which includes an eccentric mechanism, said interconnecting mechanism being pivotable about a pivot pin into one of a plurality of positions wherein said eccentric mechanism comprises an out-of-round pin, which is positioned in a corresponding out-of-round passage formed in at least one sleeve interconnecting said links, a first part of said sleeve having a round circumference positioned eccentrically with respect to a central axis position of said pin and being accommodated in a corresponding round hole formed in a first link of said links, a second part of the sleeve having a round circumference extending concentrically around the central axis portion of said pin and positioned in a corresponding hole formed in a second link of said links.

2. A conveyor, which comprises:
   at least one flexible elongated transport mechanism which includes a plurality of links wherein two of said links are pivotable about a pivot axis with respect to each other, and
   a mechanism interconnecting said links, which includes an eccentric mechanism, said interconnecting mechanism being pivotable about a pivot pin into one of a plurality of positions wherein said eccentric mechanism comprises an out-of-round pin which is positioned in a corresponding out-of-round passage formed in at least one sleeve interconnecting said links, a first part of said sleeve having a round circumference positioned eccentrically with respect to a central axis portion of said pin and being accommodated in a corresponding round hole formed in a first link of said links, a second part of the sleeve having a round circumference extending concentrically around the central axis portion of said pin and positioned in a corresponding hole formed in a second link of said links.

* * * * *